United States Patent [19]

Hoffman, Jr. et al.

[11] Patent Number: 5,009,292
[45] Date of Patent: Apr. 23, 1991

[54] MECHANISM AND METHOD OF POSITIVE ARCUATE ORIENTATION OF A FIRST MEMBER AND A SECOND MEMBER, PARTICULARLY FOR BRAKE ADJUSTED ORIENTATION OF A DRIVE MEMBER AND A DRIVEN MEMBER IN A DISC BRAKE ASSEMBLY HAVING PARKING BRAKE MECHANISM

[75] Inventors: Chalres T. Hoffman, Jr., Springboro; Ralph A. Gordon, Centerville, both of Ohio; Thomas P. Hosmer, Concord; Robert M. Lucas, Melrose, both of Mass.

[73] Assignee: General Motors Corporation, Detroit, Mich.

[21] Appl. No.: 355,012

[22] Filed: May 19, 1989

[51] Int. Cl.⁵ .............................................. F16D 65/38
[52] U.S. Cl. .............................. 188/71.7; 188/79.55; 188/196 M; 192/111 R; 403/4; 403/97; 403/103; 403/108
[58] Field of Search ............... 188/71.7, 71.9, 79.55, 188/79.57, 196 D, 196 M, 72.8; 403/108, 103, 84, 91, 92, 97, 4; 192/111 R, 99 A

[56] References Cited

U.S. PATENT DOCUMENTS

| | | | |
|---|---|---|---|
| 864,329 | 8/1907 | North | 403/108 |
| 1,057,928 | 4/1913 | Briggs | 403/4 |
| 1,801,444 | 4/1931 | Michael | 403/103 |
| 2,015,881 | 10/1935 | Alden et al. | 188/196 M |
| 2,164,846 | 7/1939 | Thompson | 403/4 X |
| 2,843,225 | 7/1958 | Miller | 188/71.7 |
| 2,948,558 | 8/1960 | Schultz | 188/196 MX |
| 2,951,723 | 9/1960 | Bernhard | 403/108 X |
| 3,767,016 | 10/1973 | Hurt | 188/71.9 |
| 3,770,082 | 11/1973 | Brooks et al. | 188/71.9 |
| 4,181,145 | 1/1980 | Mitchell | 188/71.9 X |
| 4,407,598 | 10/1983 | Hendershot | 403/4 |
| 4,561,795 | 12/1985 | Panuska | 403/4 |

FOREIGN PATENT DOCUMENTS 909527   1/1946   France ................................ 403/108

Primary Examiner—George E. A. Halvosa
Attorney, Agent, or Firm—Ernest E. Helms

[57] ABSTRACT

A disc brake caliper is provided which has a parking brake. A dual lever parking brake apply assembly is also included which allows adjustment of the parking brake without modification of the parking brake cable. The adjustment is made by changing the relative position of the levers with one another.

2 Claims, 4 Drawing Sheets

MECHANISM AND METHOD OF POSITIVE ARCUATE ORIENTATION OF A FIRST MEMBER AND A SECOND MEMBER, PARTICULARLY FOR BRAKE ADJUSTED ORIENTATION OF A DRIVE MEMBER AND A DRIVEN MEMBER IN A DISC BRAKE ASSEMBLY HAVING PARKING BRAKE MECHANISM

BACKGROUND OF THE INVENTION

Some automotive vehicles have been equipped with disc brakes on all four wheels, with the rear wheel disc brakes having incorporated therein a parking brake actuating mechanism. An example of such a mechanism is disclosed in U.S. Pat. Number 3,688,875, entitled "Disc Brake Caliper With Integral Parking Brake" and issued Sept. 5, 1972. Mechanisms of this type provide for adjustment of the disc brake as the brake linings wear. When the linings require replacement, the mechanism must be restored to its original position before the brake linings were worn to accommodate the new linings. At times this leaves the lever to which the parking brake cable is attached at such an angular position that less than all of its available stroke can then be used during parking brake actuations. Typically, that lever is attached with a hexagonal bolt and hole arrangement, so that the lever can only be adjusted in 60° increments relative to the bolt after the bolt is arcuately repositioned for new brake linings. This coarse available adjustment does not permit adjustment of the parking brake mechanism without also readjusting the parking brake cable itself. Even with such readjustment, the parking brake lever of the brake assembly may not be as near to the optimum position for maximum arcuate lever actuating stroke movement as is desired. That position occurs when the parking brake lever is against its release position stop, or within a very few degrees of it, such as up to about five degrees.

FIELD OF THE INVENTION

The invention relates to arrangements for installing a parking brake lever on a disc brake with the disc brake piston being positively positioned during field service without the need of parking brake cable adjustment. It assures that the parking brake lever is positioned against its housing stop, or very close to it, as designed for new brakes. It also relates to other mechanisms having first and second arcuately rotatable members which are arcuately movable about a common rotational axis, the members being arcuately oriented and then being secured together in a final selected arcuately fixed orientation which is one of a series of final selectable arcuately fixed orientations between the first and second rotatable members. It provides the series of final selectable arucately fixed orientations in sufficiently small increments to assure the desired final orientation which will not require adjustments to other associated mechanisms for appropriate desired operation.

SUMMARY OF THE INVENTION

In its preferred setting, the invention is incorporated in a vehicle brake system, and more particularly in one employing a disc brake having an automatic adjustment for brake lining wear, and also provided with a parking brake mechanism. The parking brake mechanism typically includes a parking brake lever attached to an arcuately rotatable part of the mechanism such as a threaded bolt extending into the disc brake caliper assembly, the parking brake lever itself being arcuately movable by means of a parking brake cable attached to one lever end.

When brake linings are worn, they require replacement in field service. This requires resetting the disc brake caliper assembly to accommodate the new linings, which are considerably thicker than the worn linings being replaced. The disc brake piston is repositioned in its fully retracted position and the new linings installed. The parking brake lever is removed from the head of the parking brake threaded bolt and the piston is advanced manually until the shoe and lining assemblies of the caliper assembly are snug against each side of the disc or rotor. The parking brake actuating lever is then reassembled arcuately relative to the threaded bolt in such a manner that it is as close as possible to the released brake lever position. That position is preferably near the release stop, which is a part of the disc brake caliper housing.

With the typical current production devices, this arcuate position of the lever could be sufficiently far from the release stop, and therefore arcuately toward the maximum apply stroke position of the lever, that substantially full parking brake application cannot be attained before the lever has reached its maximum apply stroke position. Expressed in another view, if the lever is then positioned against the release stop by the return force on the lever exerted through the cable, there will be increased clearance which must be taken up by the initial part of the brake apply stroke movement of the parking brake actuator, cable and the lever before any parking brake action can begin. From either view, lost pedal stroke translates into less parking brake maximum apply force. To correct this, the parking brake cable then has to be adjusted. This adjustment may be made where it connects to the parking brake actuator such as a pedal or hand lever applied by the vehicle operator. This is not only time consuming, but by having to make such an adjustment at the other end of the parking brake cable from its point of application of force to the brake assembly precludes extremely accurate adjustment.

With structure embodying the invention, when the disc brake piston has to be readjusted to another positive brake released position, typically after installing new, thicker, disc brake linings and shoes for linings and shoes in which the linings have been worn through use, the piston is positively positioned and the parking brake lever for actuating the piston mechanically to apply the disc brake as a parking brake is arcuately oriented at or very near its released position stop so that full parking brake apply stroke is available without having to also adjust the parking brake cable. This is accomplished by separating what is usually a one piece parking brake lever into a plurality of parts so that a first member is arcuately adjustable in small increments relative to a second member, preferably also employing an intermediate member, those increments being sufficiently small that the parking brake lever is touching or immediately adjacent the release stop, and no adjustment of the brake cable is needed.

The invention embodies mechanism which accomplishes the desired result and method for obtaining that result. It uses first means on the intermediate member cooperating with mating means on the first member for arcuately orienting the intermediate member to the first member and holding the intermediate member in a first selected arcuately fixed orientation relative to the first member which is selected from a first plurality of arcuately equally spaced arcuate orientations of the intermediate member relative to the first member. The intermediate member also has second means cooperating with mating means on the second member for arcuately orienting the second member to the intermediate member in a second selected arcuately fixed orientation selected from a second plurality of arcuately equally spaced arcuate orientations of the second member relative to the intermediate member and thus in the final selected arcuately fixed orientation of the second member to the first member. The first and second pluralities of orientations are in such cooperative relation that the adjacent ones of the series of final selectable arcuately fixed orientations between the first and second members have lesser arcuately spaced degrees therebetween than the degrees of arcuate spacing between adjacent ones of the orientations of either of the first and second pluralities of arcuately equally spaced arcuate orientations.

In a preferred embodiment, the first plurality of arcuately equally spaced arcuate orientations has different degrees of arcuate spacing between adjacent ones thereof from the degrees of arcuate spacing between adjacent ones of the orientations of the second plurality of arcuately equally spaced arcuate orientations. Therefore one of the plurality of arcuately equally spaced arcuate orientations then has more degrees of arcuate spacing between adjacent ones thereof than the degrees of arcuate spacing between adjacent orientations of the other of the plurality of arcuately equally spaced arcuate orientations.

In one arrangement one of them may have about 1.5 times the number of degrees of such arcuate spacing as compared to the other. In some instances this multiple may be restricted to a whole number greater than one.

In other arrangements one of them may have thirty or sixty degrees of arcuate spacing between adjacent arcuately equally spaced arcuate orientations and the other may have about five to fifteen degrees of such arcuate spacing.

An arrangement may be such that the numerical value of the degrees of arc of the arcuate spacing between adjacent ones of one of the plurality of arcuately equally spaced orientations is evenly divisible into 360 degrees to yield a whole number quotient in the range of 30 to 90, and the numerical value of the degrees of arc of the arcuate spacing between adjacent ones of the other of the plurality of arcuately equally spaced orientations is evenly divisible into 360 degrees to yield a whole number quotient in the range of 60 to 180. The first selection is preferably made from the one plurality of orientations, selecting the one that is closest to the final desired orientation, and the selecting the one of the other plurality of orientations which in combination with the first selected one is closest to the desired arcuately fixed orientation, that combination being closer to the desired arcuately fixed orientation than either of the selected ones of the two pluralities of orientations alone would be.

One of the plurality of arcuately equally spaced arcuate orientations may be no more than six and the other plurality of arcuately equally spaced arcuate orientations must be in excess of six, in some variations.

In some instances, one of the plurality of such orientations may extend in total through about 160 degrees of arc and the other plurality of such orientations may extend in total through no more than about 270 degrees of arc.

An embodiment of the invention may have both of the arcuately equally spaced arcuate orientations defined by mating and mateable tooth sets.

One variation of that embodiment of the invention may have on the intermediate member one tooth set of external teeth extending in total throughout an arc of less than 180 degrees. The other tooth set on the second member are then internal teeth extending in total throughout an arc which is less than the external teeth extending arc and is no more than about 90 degrees, with an arcuate space on each side of the teeth instead of additional teeth. Each of these arcuate spaces receives at least one of the external teeth in arcuately spaced relation to and arcuately beyond the total arc extent of the internal teeth, the combination of the internal teeth and the arcuate spaces extending in total throughout an arc range of more than 180 degrees and less than about 270 degrees.

Another embodiment of the invention may have one of the plurality of arcuately equally spaced arcuate orientations defined by mating equal angled polygons having equal length sides. One of the polygons is formed on the first member and the other of the polygons is an opening formed through the intermediate member so that the intermediate member may be arcuately oriented on the first member in a number of arcuately fixed equally spaced orientations equal to the number of polygon sides. While the polygons are illustrated as having straight or flat surface sides, it is to be understood that this terminology is sufficiently broad to include somewhat convex or concave curved polygon sides. One or both of the polygons may be formed by a double polygon arrangement, such as a double hexagon or double octagon to have a twelve-sided or sixteen-sided effect. These variations are included in the descriptive term of being multi-equal sided non-circular sides.

In practicing one method aspect of the invention, the first plurality of arcuately equally spaced arcuate orientations are established between an intermediate member and a driven member, the second plurality of arcuately equally spaced arcuate orientations are established between a drive member and the intermediate member, a desired arcuate position of the driven member and a desired arcuately fixed orientation of the drive member to the driven member are also established. Then the closest one of the first plurality of orientations to the desired driven member arcuate position is selected, and the intermediate member is fixed to the driven member at that selected orientation. Then one of the second plurality of orientations is selected which in combination with the selected one of the first plurality of orientations is closest to the selected desired orientation of the drive member to the driven member. The drive member is then fixed to the intermediate member at the last-selected orientation and therefore to the driven member, establishing an actual arcuately fixed orientation of the drive member to the driven member which is a combination of the two selected ones of the pluralities of orientations, and which is within acceptable arcuate limits relative to the desired arcuately fixed orientation of the drive member to the driven member.

The method embodying the invention also includes differently defined steps wherein a table of relationships is established in which $A \times B$ equals 360 with values of A and B being integers, wherein, when A equals the number of sides of an equal-sided polygon, B equals the angle, expressed in degrees of arc, subtended by each of the sides of the polygon. A first polygon surface is then established on a segment of a rotatable driven member, the axes of the polygon surface and the driven member being coaxial. The first polygon surface has at least 3 sides, all of which are of equal length, the actual number of those sides being chosen from the values of A in the table earlier established, with the angle in degrees of arc subtended by each of the polygon sides being the corresponding value of B in that table. A second polygon surface is established as an opening in an intermediate member which is surface mateable with the first polygon surface so as to receive the first polygon surface therethrough in surface engaging relation. The polygon sides and their corresponding angles cooperate to establish a first plurality of arcuately equally spaced arcuate orientations of the intermediate member relative to the driven member. A drive member is provided which is rotatably received on the driven member, and a second plurality of arcuately equally spaced orientations of the drive member relative to the intermediate member is established. The second plurality of orientations are arranged to extend through an arc sector having its axis coincident with the axis of rotation of the driven member. The degrees of arcuate spacing subtended between any two adjacent ones of the second plurality of orientations are established as having a degrees-of-arc value which is numerically equal to one of the numerical values of B in the table. A desired arcuate position of the driven member is established, as well as a desired arcuately fixed orientation of the drive member to the driven member, and the closest one of the established first plurality of orientations to the desired arcuately fixed orientation of the drive member to the driven member is then selected, and the intermediate member is arcuately fixed to the driven member at that selected orientation. One of the second plurality of orientations is then selected, being the one closest to the desired arcuately fixed orientation of the drive member to the driven member, and the drive member is then fixed to the intermediate member at that selected orientation. The drive member, intermediate member and the driven member are then secured arcuately together to establish an actual arcuately fixed orientation of the drive member to the driven member which is within acceptable arcuate angular limits relative to the already established desired arcuately fixed orientation of the drive member to the driven member, with such angular limits being less in degrees of arc than the degrees-of-arc values of B of the first polygon surface and also less in degrees of arc than the degrees-of-arc value of the subtended angle between two adjacent ones of the established second plurality of orientations.

The method of the invention is also definable as the method of assembly or attachment of various elements of a structurally defined disc brake assembly embodiment of the invention. This includes the steps of positioning the intermediate member on the parking brake lever in a selected orientation and securing the two together in that orientation to form a parking brake lever assembly, detaching the parking brake return spring of the disc brake assembly and then rotating the disc brake actuator shaft in the direction of parking brake application until the brake linings are firmly seated against the rotor but not exceeding 70 NM while so rotating. The assembled intermediate member and parking brake lever are then installed on the parking brake actuator shaft of the disc brake assembly in a selected orientation which is as close as possible to the released brake lever position wherein the parking brake lever is touching or immediately adjacent the lever release position stop on the brake caliper, this installation being made without rotating the parking brake actuator shaft. The preassembled intermediate member and parking brake lever are then secured to the parking brake actuator shaft in the installed selected orientation of the intermediate member and the parking brake lever on the parking brake actuator shaft, that securing action securing same against relative axial and rotational movements. A force on the order of 22 N is then applied to the parking brake lever at the point where the parking brake cable is to be attached, that force being applied in the direction of parking brake release. That applied force moves the parking brake lever and the parking brake actuator shaft arcuately in the parking brake release direction to no more extent than the lever release position stop permits. With the parking brake lever in its release position, the distance between the parking brake lever and the lever release position stop, having established a desired range of that distance of about 0.0 mm minimum to about 5 mm maximum, and determining whether the actual distance is within or greater than the established desired range. The next step is performed only if the actual distance is greater than the established desired range, that next step being the removal of the earlier applied force acting toward the release position and then unsecuring the intermediate member and the parking brake lever and then repositioning the parking brake lever relative to the intermediate position so that the parking brake lever is as close to the lever release position stop as possible and then resecuring the parking brake lever to the intermediate member, after which the steps beginning with the application of about 22 n of force in the release direction are repeated necessary until the actual distance between the parking brake lever and the lever release position stop is within the established desired range. If the actual distance is less than 3 mm, the service brake is applied and released three to four times and the brake is then checked for brake drag on the disc. If brake drag is found to exist, the step above in which the release direction force is removed is repeated but the parking brake lever is repositioned at least one possible orientation position of the parking brake lever relative to the intermediate member away from the lever release position stop. The steps, beginning with the apply and release of the service brake three to four times and continuing until no brake drag is found to exist, are repeated until the actual distance between the parking brake lever and the lever release position stop is no more than 5 mm. The parking brake cable is then attached to the parking brake lever and the return spring is reinstalled. The parking brake mechanism is then applied and released three or four times, checking for proper parking brake operation.

DETAILED DESCRIPTION

The disc brake assembly containing the invention is illustrated as being of the floating caliper type having a parking brake mode of operation as well as a service brake mode of operation. Typical disc brake assemblies of this type are disclosed in U.S. Pat. Nos. 3,688,875-DeHoff et al, issued Sept. 5, 1972 and entitled, "Disc Brake Caliper With Integral Parking Brake"; 3,767,016-Hurt, issued Oct. 23, 1973 and entitled, "Brake Actuator and Adjuster Mechanism"; 3,770,082-Brooks et al, issued Nov. 6, 1973 and entitled, "Disc Brake Caliper Assembly"; 4,181,145-Mitchell, issued Jan. 1, 1980 and entitled, "Two-Way Check Valve"; and 4,306,635-Mitchell, issued Dec. 22, 1981 and entitled, "Disc Brake Assembly Having a Diaphragm Pressure Compensator and Seal". However, it is to be understood that the invention may be adapted to other types of disc brake assemblies as well as other mechanisms requiring positive arcuate orientation of a first member to a second member via an intermediate member.

Figure 3:
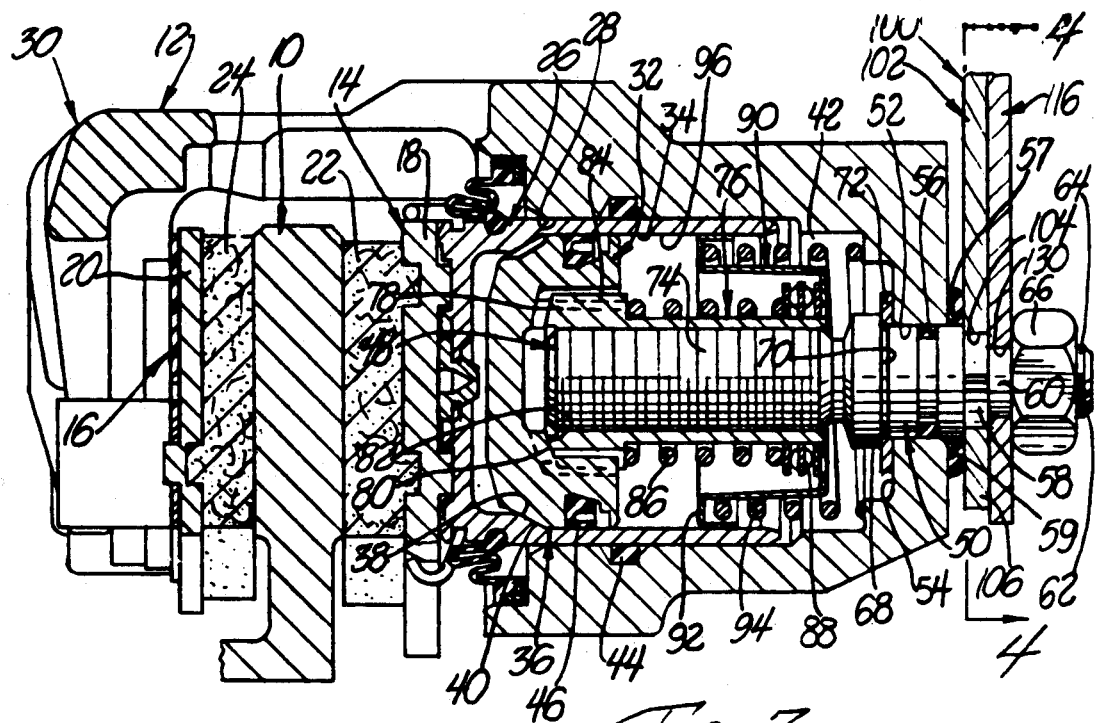
FIG. 3 is a cross section view of the mechanism of FIG. 1, taken in the direction of arrows 3—3 of that Figure and having parts broken away.

The assembly includes a disc or rotor 10, shown in FIG. 3, which is attached to a vehicle wheel assembly for rotation therewith, and a disc brake caliper assembly 12 which is suitably attached to a stationary vehicle member not shown. Inner and outer brake shoe assemblies 14 and 16 are positioned on opposite sides of disc 10 and include backing plates 18 and 20 to which suitable brake linings 22 and 24 are secured. Shoe assembly 14 is connected to either the caliper 12 or the stationary vehicle member in a manner which prevents rotary movement thereof relative to the caliper. Shoe assembly 16 is suitably attached to either caliper 12 or the stationary vehicle member. A cup-shaped outer piston 26 is slidable in an axially extending bore 28 formed in the caliper housing 30. Piston 26 is prevented from rotating in bore 28 by suitable connection with projections and recesses respectively on the backing plate and in the piston head.

An inner piston 32, also cup-shaped, is slidable in a bore 34 formed in piston 26. A cone clutch 36 is formed by mating frusto-conical surfaces 38 and 40 of piston 26 and piston 32, respectively, and acts between those pistons. FIG. 3 shows the cone clutch 36 in its normal or operative condition wherein the frictional engagement of the frusto-conical surfaces 38 and 40 prevents rotation of piston 32 and also provides an axial force transmitting connection between the two pistons. The caliper housing 30, piston 26 and piston 32 cooperate to define chamber 42. That chamber is pressurizable to force piston 32, piston 26 and shoe assembly 14 toward disc 10 whereby the shoe assembly 14 is forced into braking engagement with the disc 10. The reaction force is transferred through the caliper housing 30 to force brake shoe assembly 16 into braking engagement with the other side of disc 10. The fluid integrity of chamber 42 is maintained by a seal 44 located between caliper housing 30 and piston 26 and by a seal 46 located between pistons 26 and 32. The structure therefore provides for service braking by hydraulic pressure actuation.

The brake assembly also provides automatic wear adjustment and auxiliary actuation for parking. A rotatable shaft 48 has a shank 50 which extends through a bore 52 in the cylinder end wall 54 of the caliper housing 30. It is provided with a seal 56 which seals the bore 52 and therefore chamber 42 at this point. Beyond the seal 56, where shaft shank 50 extends outward of the caliper housing, the shank is stepped in progressively smaller maximum diameter sections. These sections in axial progression are a polygonal, and preferably hexagonal, cross section part 58 and a circular part 60. Part 60 terminates in an outer end 62 having external threads 64 formed therein. When in the assembled condition shown, a nut 66 is threaded on threads 64.

Inward of shaft shank 50 there is an enlarged shaft portion 68 defining a thrust surface 70 engaging the thrust member 72. This member acts as a bearing between the thrust surface 70 and the cylinder end wall 54. The inner part of shaft beyond shaft portion 68 is a screw with a high lead thread 74 extending into piston 26 and also partially into piston 32. An adjuster nut 76 is internally threaded so as to be received on high lead thread 74. Adjuster nut end 78 forms a convex or similar frusto-conical surface 80 which is engageable with a mating concave or similar frusto-conical surface 82 formed on piston 32. A splined connection 84 is formed between adjuster nut 76 and piston 32 and permits relative axial movements while preventing relative rotational movements therebetween. A compression coil spring 86 is received about a part of adjuster nut 76 and has one spring end engaging a shoulder formed on the nut. The other end of the spring 86 engages a spring seat on a thrust bearing 88 to transmit spring force to the inner flange of an annular hat-shaped spring retainer 90. Retainer 90 is also received about the adjuster nut 76. Its outer flange 92 is channel-shaped to provide a spring seat for one end of preloaded compression coil spring 94. The outer wall of flange 92 is in slidable engagement with the cylindrical inner wall 96 of the bore 34 of piston 26. The other end of spring 94 is seated on cylinder end wall 54. Spring 94 thus urges spring retainer 90 toward piston 32, which in turn acts through thrust bearing 88 to urge spring 86 toward piston 32, which in turn urges adjuster nut 76 toward engagement of its surface 80 with surface 82 of piston 32, and when so engaged the springs 86 and 94 urge the piston clutch surface 40 of piston 32 into clutching engagement with piston clutch surface 38 of piston 26. In the normal rest or released position shown in FIG. 3, piston 26 cannot be knocked back into caliper housing 30 since the engagement of clutch 36 prevents rotation and consequent axial movement of piston 32 and adjuster nut 76 splined thereto. The brake shoe assemblies 14 and 16 are therefore held in close relationship to the disc 10.

When the brakes are hydraulically applied by introducing pressurized brake fluid into chamber 42, pistons 32 and 26 and brake shoe assembly 14 are displaced toward disc 10 and the brake shoe assembly 14 engages one side of that disc. Reaction forces transferred through the caliper housing 30 also move that housing to the rights as seen in FIG. 3, moving brake shoe assembly 16 into engagement with the other side of disc 10. Since the cone clutch 36 is engaged during hydraulic actuation, the piston 32 and the adjuster nut 76 splined to it cannot rotate. In the event of lining wear during the hydraulic actuation, piston 26 may be moved in the brake apply direction so as to at least incipiently open clutch 36 enough to have no clutching action, at which time piston 32 and adjuster nut 76 are not prevented from rotational movement. The spring force on adjuster nut 76 will cause it to advance axially on shaft threads 74 toward the disc 10, imparting a rotational movement to the nut 76 and the piston 32 as well as moving them axially so that clutch 36 is reengaged.

When the hydraulic pressure is released to release the brake, piston 26 can return toward the cylinder end wall 54 only to the extent that piston 32 in its more advanced axial position permits it to return, thus achieving an adjustment for the amount of brake lining worn away and keeping the brake shoe assemblies close to the disc 10.

Auxiliary actuation of the brake for parking is accomplished by rotation of shaft 48 to drive nut 76, piston 32, piston 26 and brake shoe assembly 14 in the brake apply direction, engaging the brake shoe assembly 14 with disc 10. The mechanical reaction to this brake applying force is transmitted through thrust member 72 to the caliper housing 30 and thence to brake shoe assembly 16, engaging that brake shoe assembly with the other side of disc 10. The parking brake lever mechanism 100, connecting the shaft 48 to a parking brake cable so that when the cable is tensioned the brake is so applied, is the subject of the invention herein disclosed and claimed. It includes a drive member, an intermediate member, and employs the shaft 48 as a driven member.

The parking brake lever mechanism 100 disclosed In FIGS. 1-4 is a two-member mechanism with a fastening device securing the two together at the most appropriate available relative arcuate position. One member 102, which is the intermediate member, has a polygonal, and preferably hexagonal, opening 104 at one end 106 which is of a size to be mounted on the hexagonal part 58 of shaft shank 50. The other end 108 of member 102 has three bolt-receiving openings 110, 112 and 114 therethrough with their axes in parallel and planar alignment with the axis of opening 104. The other member 116 has at one end 118 a hooked arrangement 120 of any appropriate well-known type which provided a connection with the parking brake cable 122. End 118 also has a spring seat 124 receiving one end of the coil compression parking brake return spring 126. The other end of spring 126 is seated on spring seat 128, which is secured to a part of the disc brake caliper housing 30. Spring 126 continually urges the parking brake lever toward the brake release position.

A center portion of member 116 has a circular opening in it which fits over the circular part 60 of shaft shank 50 so that the member is piloted on part 60 for rotational movement during installation. The other end 132 of member 116 has a damper weight 134 secured to it. The part of member 116 from weight 134 to a distance about half way to opening 130 is considerably wider than the remainder of member 116, and is provided with several openings arranged in a particular arcuate and angular pattern. Considered arcuately, there are three arc series of openings with their centers located on arcs 136, 138 and 140. These arcs are concentric about the center of opening 130. The outer series of openings on arc 136 is illustrated as having four openings 142, 144, 146 and 148. In the particular arrangement illustrated, these openings are arcuately spaced fifteen degrees apart. The middle series of openings on arc 138 is illustrated as having four openings 150, 152, 154 and 156 which are also arcuately spaced fifteen degrees apart. The inner series of openings on arc 140 is illustrated as having three openings 158, 160 and 162 which are also arcuately spaced fifteen degrees apart.

Figure 1:
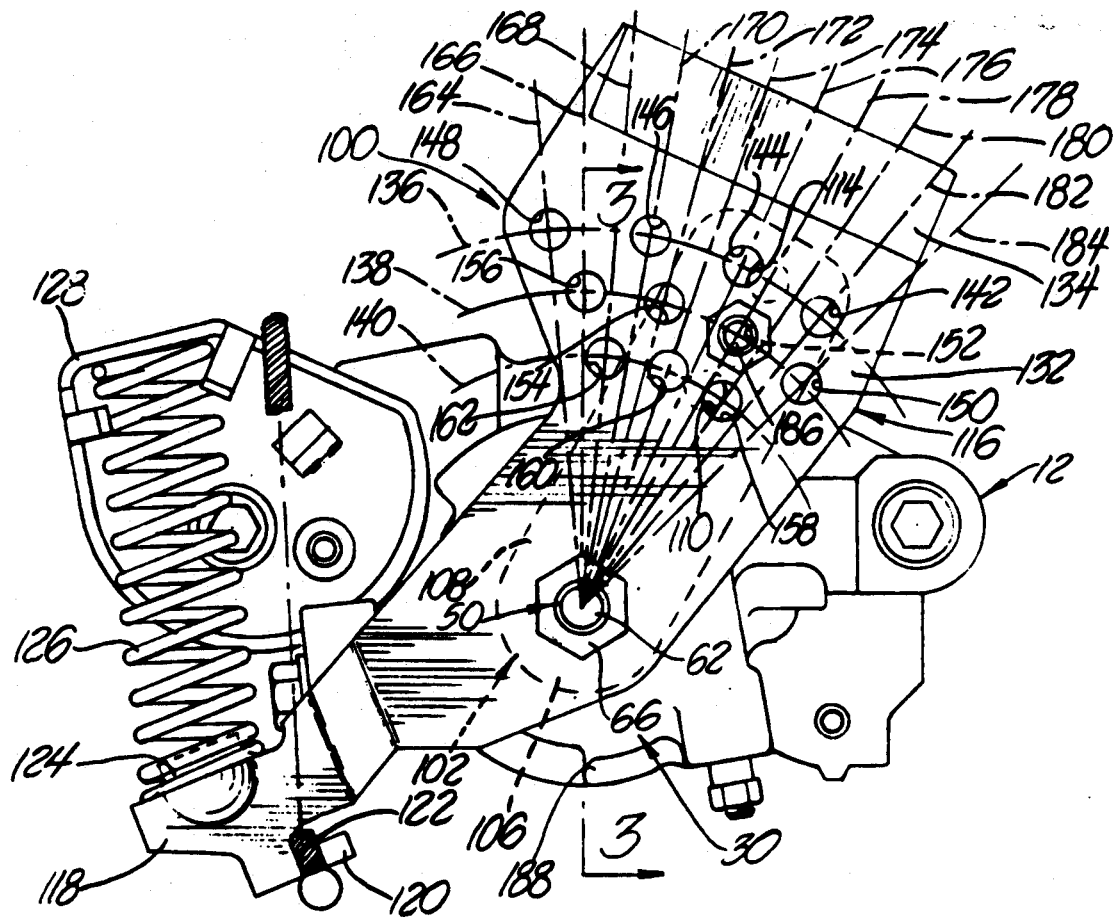
FIG. 1 is an elevation view of mechanism embodying the invention while in or near the parking brake released position and having one particular orientation of the parking brake lever in relation to the parking brake shaft.
Figure 2:
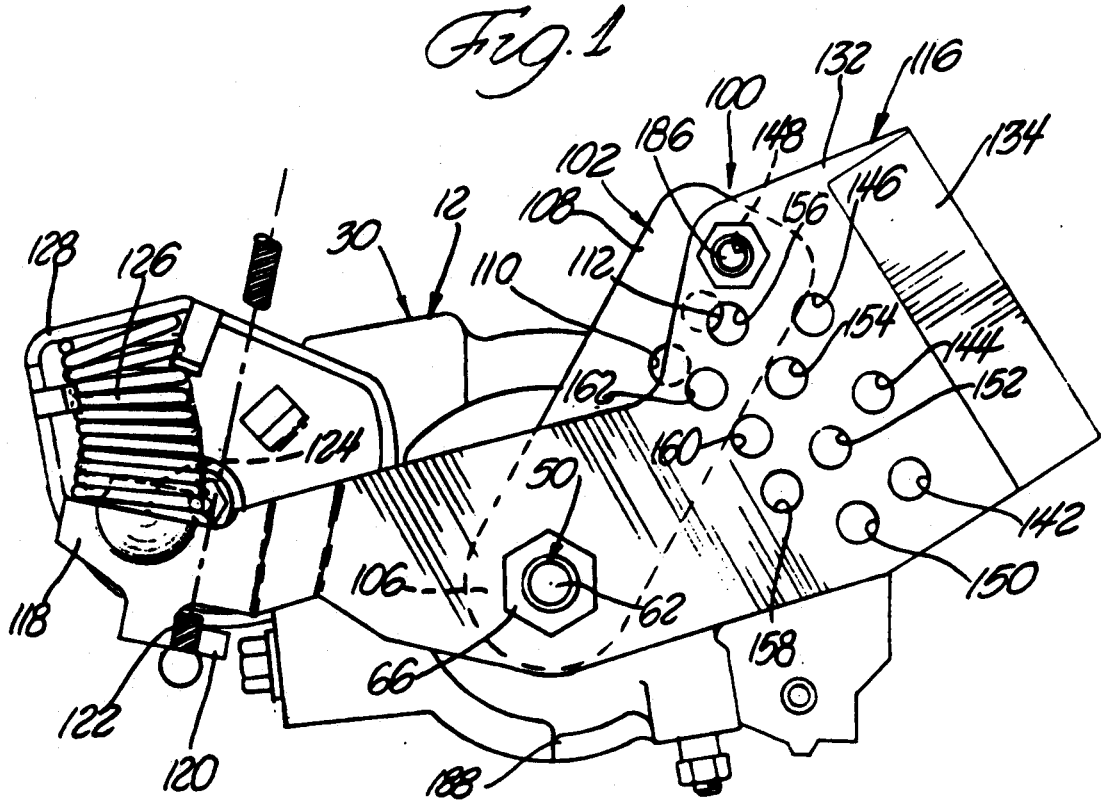
FIG. 2 is an elevation view similar to that of FIG. 1, but showing the parking brake lever in a different orientation relative to the parking brake shaft, the mechanism being shown in the parking brake applied position.

As is better seen in FIG. 1, there is a five degrees-of-arc distance from opening 148 to opening 156, another 5 degrees-of-arc distance from opening 156 to opening 162, another five degrees-of-arc distance from opening 162 to opening 146, etc. Therefore the eleven openings considered as a whole are each spaced five degrees-of-arc apart from its arcuately adjacent neighbors. This is illustrated by the eleven radii 164, 166, 168, 170, 172, 174, 176, 178, 180, 182 and 184 passing through the center of opening 130 and the respectively through the centers of openings 148, 156, 162, 146, 154, 160, 144, 152, 158, 142 and 150.

Opening 110 of member 102 has its center on the same arc 140 about the center of opening 104 as the arc 140 of the series of openings about the center of opening 130. The centers of openings 104 and 130 are coincident with the axis of shaft 48 and therefore with each other when both members are installed on the shaft as seen in the drawings. Similarly, openings 112 and 114 are respectively on the same arcs 138 and 136. Therefore one of the three openings 110, 112 and 114 of member 102 can be aligned with another one of the openings of one of the arc series of openings for each five degrees of relative movement of members 102 and 116. Since member 102 can be oriented in sixty degree increments on shaft 48 because of the possible matings of hexagonal shaft part 58 and hexagonal opening 104, and the member openings are alignable in five degree increments over a fifty-five degree range, it is clear that by proper orientation of member 102 on shaft 48 and then member 116 on that shaft, one of the openings 110, 112 and 114 can be aligned with one of the eleven arc openings of member 116 so that member 116 is within at least 2.5 degrees of arc of a desired fixed orientation of the parking brake lever mechanism in arcuate relation to shaft 48. When that opening aligned position is attained, the fastener 186, illustrated as a bolt and nut, has the bolt portion inserted through the two aligned openings and the nut is tightened on it and locked in place by suitable means such as locking threads, a lock washer or the like. The nut 66 is similarly tightened in place to hold the members 102 and 116 axially and arcuately in fixed relation to the shaft 48.

The desired position of the parking brake lever mechanism 100 is its released position with the member 116 engaging its stop 188 on the caliper housing, or within the desired arcuate degree range of it. In this particular instance that desired range is from 0 degrees of arc to 2.5 degrees of arc of the stop. When a greater or lesser range of degrees of arc is acceptable, the openings in the arc series of openings of member 116 may have their radii spaced at greater or lesser degrees of arc, and the number of openings in each arc series of openings may be decreased or increased as needed. If, instead of a six-sided shaft portion 58 and opening 130, a twelve-sided portion and opening or a hexagonal shaft portion and a double hexagonal opening are used, the member 102 may be oriented in 30 degree increments instead of 60 degree increments. Lesser arc openings may then be required for full coverage.

It has been found that a table of relationships of the polygonal opening orientation increments of member 102 and the arcuate spacing of the arc openings of member 116 can be constructed as follows:

A = the number of sides of an equal-sided polygon; this would also be "12" for a double hexagon opening used with a hexagon shaft part 58.

B = the angle, expressed in degrees of arc, subtended by each of the polygon sides; and A × B = 360. A and B are preferably integers for simplicity.

The polygons of shaft part 58 and opening 130 are selected in which A is at least 3 and B is the value then corresponding to A. By way of example: If A = 3, B = 120 degrees. If A = 4, B = 90 degrees. If A = 5, B = 72 degrees. If A = 6, B = 60 degrees. If A = 9, B = 40 degrees. If A = 12, B = 30 degrees. If A = 72, B = 5 degrees. These relationships continue throughout the range from A = 3 to A = 180. However, it is usually not very practical to have a large number of sides due to ease of manufacture and the tendency to wear off the corners between adjacent sides when they do not form reasonably sharp intersecting angles and high torsional forces are applied many times.

Therefore keeping A in the range of "6" to "12" is desirable.

The arcuately equally spaced arcuate orientations of the member 116, which is the drive member, relative to member 102, which is an intermediate member, are then such that the degrees of arcuate spacing subtended between any two adjacent ones of these orientations have a degrees-of-arc value numerically equal to one of the numerical values of B in the above table of relationships.

Referring to the arrangement in FIGS. 1-4 of the drawings, A = 6 and B = 60 degrees. This defines the hexagonal configuration of part 58 of shaft 48 and of opening 104 of member 102. In the table, one value of B is 5 degrees, and the degrees-of-arc value between adjacent radii (e.g., radii 164 and 166) is 5 degrees. If the degrees-of-arc value is chosen differently from any value of B in the table, the full spread of orientation possibilities will not be even. For example, the maximum difference from the desired orientation is always 2.5 degrees in the illustrated example. However, the maximum difference from the desired orientation will not always be the same value when an improper value of the degrees-of-arc is chosen. At such times, there may be an isolated maximum difference greater than the consistent maximum difference, resulting in the possibility that in a particular circumstance the minimum spacing desired cannot be obtained.

Figure 5:
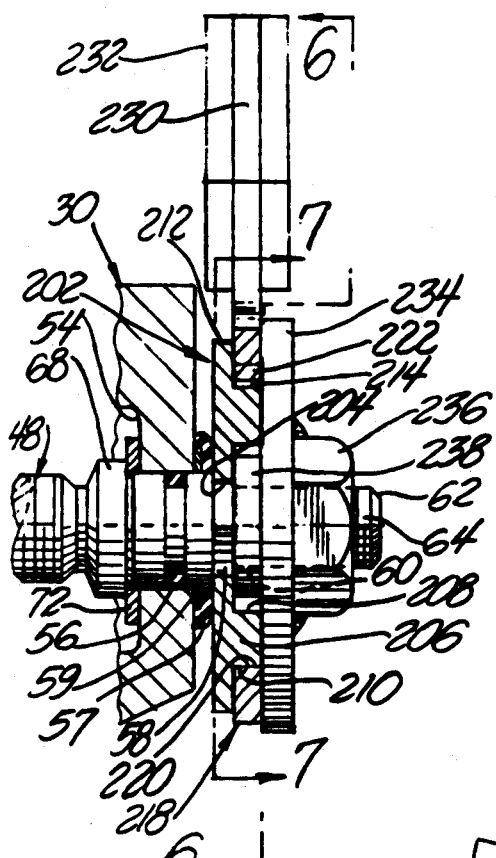
FIG. 5 is a fragmentary cross section view of another embodiment of the mechanism of FIG. 1, similar to a part of FIG. 3, with parts broken away.
Figure 7:
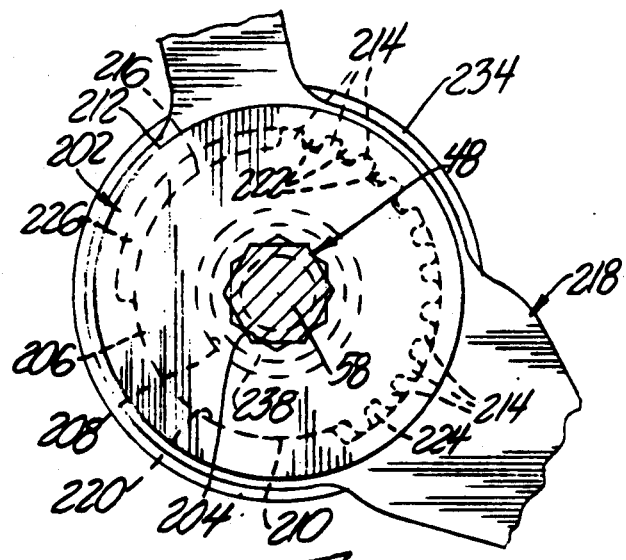
FIG. 7 is a fragmentary cross section view of the mechanism of FIG. 5, taken in the direction of arrows 7—7 of that Figure and having parts broken away.
Figure 6:
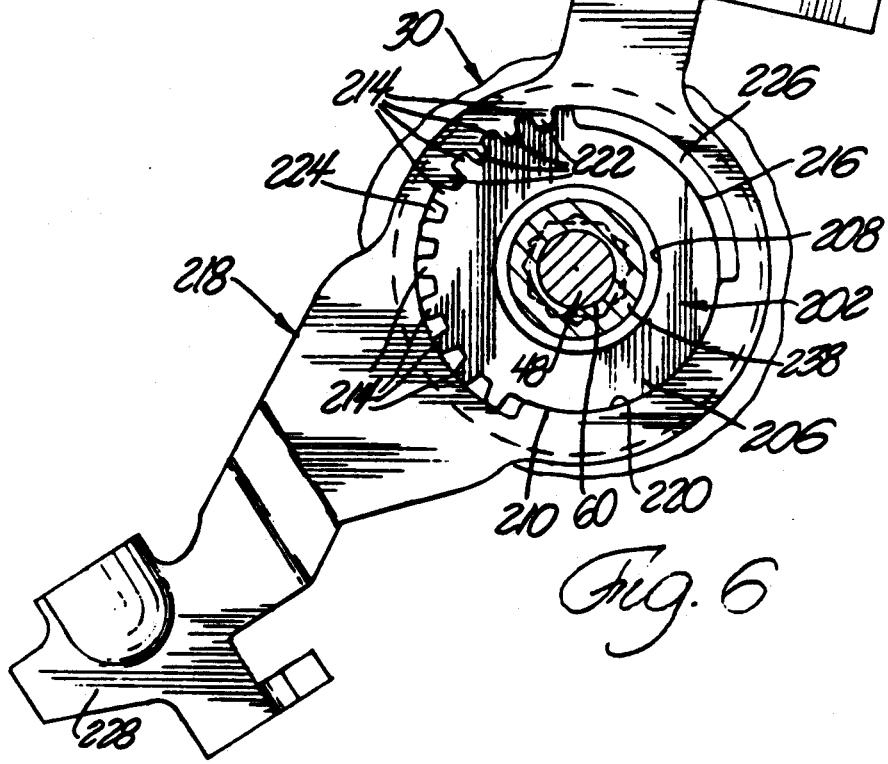
FIG. 6 is a cross section view of the mechanism of FIG. 5, taken in the direction of arrows 6—6 of that Figure and having parts broken away.

The embodiment of the invention illustrated in FIGS. 5-7 has an intermediate member 202 which is an annular plate having a polygonal opening 204 in the center thereof. While opening 204 may be hexagonal, in this embodiment it is preferred that it be a double hexagon, or in effect twelve sided. It therefore has twelve possible orientations on shaft 48. Opening 204 fits the hexagonal part 58 of shaft shank 50. An axially extending circumferential flange 206 is formed on member 202 so that it extends toward the outward side of the member when the member is installed as shown. The inner periphery 208 of flange 206 is radially greater than the maximum diameter of the double hexagonal opening 204. Its outer periphery 210 is located somewhat radially inward of the outer periphery 212 of member 202 and has an external gear tooth set 214. Tooth set 214 extends about the outer periphery 210 of flange 206 in total throughout an arc of less than 180 degrees. The remainder 216 of the outer periphery 210 of flange 206 extends arcuately for more than 180 degrees and has a radius which is no greater than, and may be slightly less than, the root diameter of the teeth of tooth set 214.

The parking brake lever member 218 is the drive member as is the member 116 of the previously described embodiment. Also as before, the driven member is the shaft 48. Member 218 has an opening 220 which has substantially the same radius as does the remainder 216 of the outer periphery 210 of member 202. The opening 220 has an internal tooth gear tooth set 222 formed so that the outer ends of the teeth of that set are on a circumferential arc having the same radius as, or a slightly greater radius than, the radius of opening 220 comparable to the radius of remainder 216 of outer periphery 210 of member 202. The total arc subtended by gear tooth set 222 is no more than 90 degrees, and is shown as being about 52 degrees. Opening 220 has larger diameter portions on each arcuate side of gear tooth set 222 which are arcuate spaces 224 and 226. The combined arcuate extension of gear tooth set 222 and arcuate spaces 224 and 226 is greater than 180 degrees but preferably less than 270 degrees. Thus the portion of opening 220 having substantially the same diameter as the peripheral remainder 216 of member 202 extends for at least 90 degrees. Gear tooth set 222 is preferably diametrically opposite that portion of opening 220. The combined arcuate length of the gear tooth set 222 and either one of the arcuate spaces 224 or 226 is less than the arcuate length of gear tooth set 214 to the extent of at least one tooth of gear tooth set 214. Therefore when the two gear tooth sets are meshed as shown in FIGS. 6 and FIG. 7, or to the arcuately opposite extreme, there will be at least one tooth of gear tooth set 214 on each side of gear tooth set 222. This permits all of the teeth in gear tooth set 222 to be loaded when arcuate forces are exerted on member 218, utilizing the full strength of those teeth at all times.

Figure 4:
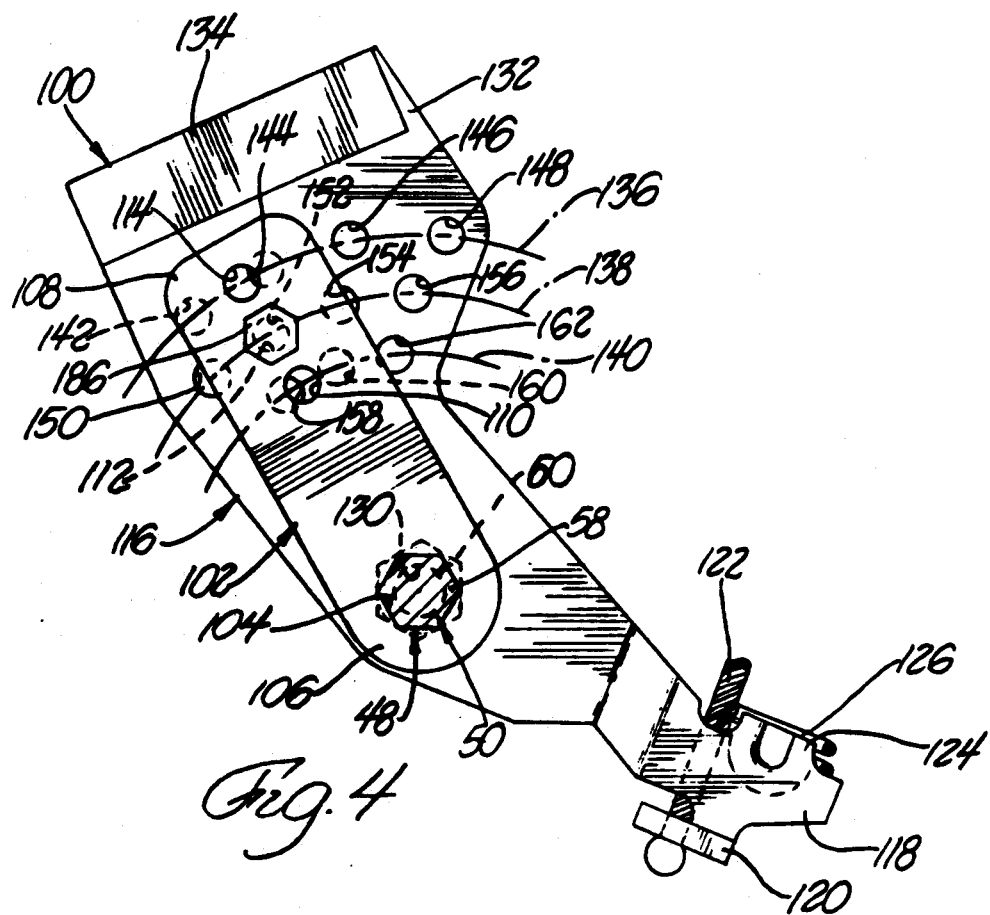
FIG. 4 is a cross section view of the mechanism of FIG. 3, taken in the direction of arrows 4—4 of that Figure.

One end 228 of member 218 is constructed in a similar manner to end 118 of member 116 of FIG. 4, making arrangements for connection with the parking brake cable and the parking brake lever return spring. The other end 230 of member 218 has a damper weight 232 provided thereon which is much like damper weight 134 of member 116.

A retainer 234 is suitably secured to or formed as a part of the nut 236. The retainer has an annular flange 238 extending from the opposite side thereof from the nut 236. The inner periphery of the flange 238 is preferably about the same diameter as the diameter of the circular part 60 of shaft 48 so that it fits over that part in a pilot fit fashion as the nut is threaded onto the shaft after intermediate member 202 and member 218 have been installed thereon as shown. The thickness of intermediate member 202 in the area of double hexagonal opening 204 is preferably the same but no more than the axial width of the hexagonal surface 58 of shaft 48, and the axial length of flange 238 is preferably the same but no more than the axial length of flange 206, so that when the nut 236 and retainer 234 are fully tightened, the intermediate member 202 and the member 218 are secured in place on shaft 48. Therefore any arcuate movement of member 218 will cause the same amount of arcuate movement of the shaft 48.

When servicing the disc brake, including replacement of worn shoes with new shoes, the disc brake pistons 26 and 32 must be positively repositioned. The invention assures that the parking brake lever 218 will be positioned against the housing stop 188 or within an allowable limit of space from it as earlier discussed. The lock nut holding the parking brake lever on the shaft and the parking brake lever are removed. The pistons are then advanced manually by turning the shaft 48 until the shoe and lining assembles 14 and 16 are snug against each side of the disc or rotor 10. The intermediate member 202 and the parking brake lever member 218 are assembled so that their gear tooth sets 214 and 222 mesh. They are inserted over the shaft so that the double hexagonal opening 204 of the intermediate member 202 fits over the hexagonal part 58 of the shaft. The member 202 may be first inserted over the shaft, and the member 218 then inserted over the shaft and the gear tooth sets 214 and 222 meshed with the member 218 in at least approximately the desired arcuate orientation. If the parking brake lever member is not properly positioned relative to its stop, but is within less than 15 degrees of the correct position, it is removed and arcuately moved in the proper direction relative to the intermediate member until it is in the allowable range of the correct position. If it was more than 15 degrees from the correct position, the intermediate member is reoriented on the shaft until the lever member is within less than 15 degrees of the correct position. Then the procedure is followed to locate the lever member 218 relative to the installed intermediate member 202 as above described. The nut and retainer assembly 238, 236 is then threaded on the end 62 of shaft 48 and tightened into the final assembly position earlier described. While the arcuate angular spacing between two adjacent teeth of each gear teeth set may be on the order of fifteen degrees, smaller increments of orientation may be obtained by decreasing this angular spacing to ten or even five degrees. Then a closer final result to the desired result of having the brake lever 218 just engaging the stop 188 in the full parking brake release position can be obtained. This requires more gear teeth in the same arcuate space, of course.

Figure 8:
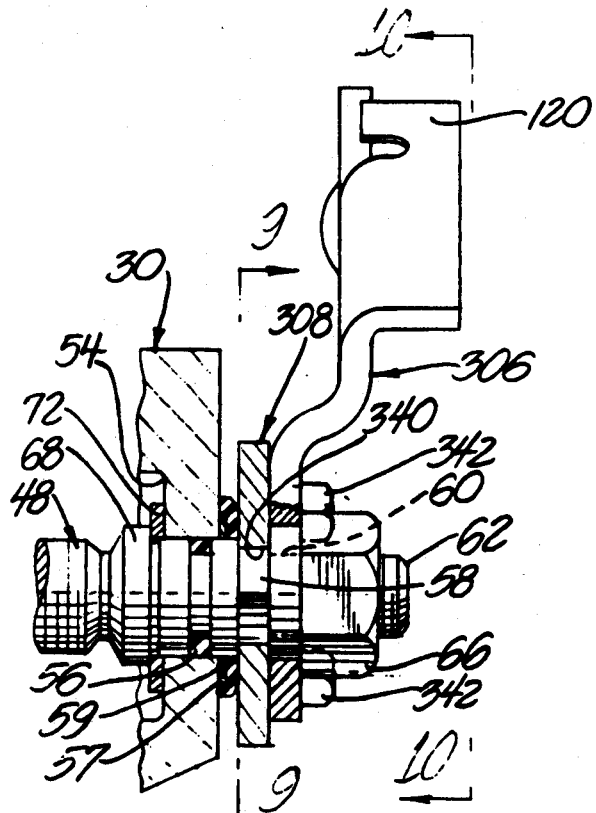
FIG. 8 is similar to FIG. 5 and shows another embodiment of the mechanism embodying the invention.
Figure 9:
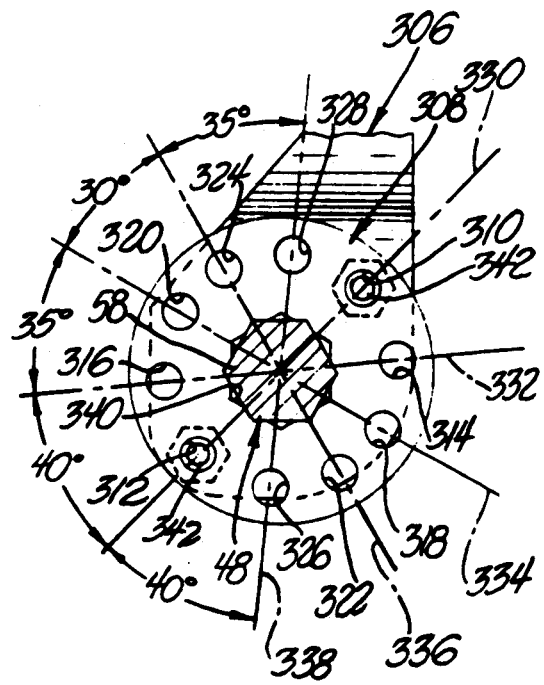
FIG. 9 is a fragmentary cross section view of the mechanism of FIG. 8, taken in the direction of 9—9 of that Figure and having parts broken away.
Figure 10:
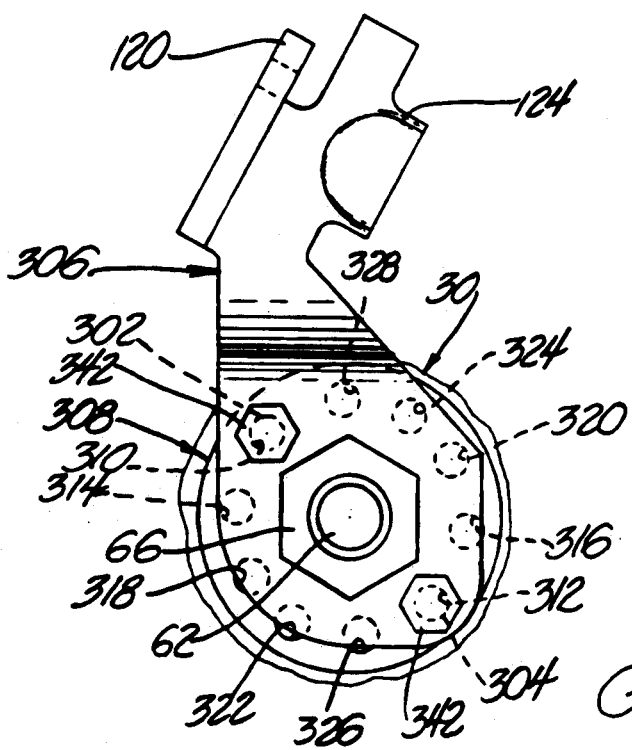
FIG. 10 is an elevation view of the mechanism of FIG. 8, taken in the direction of arrows 10—10 of that Figure.

The embodiment of the invention shown in FIGS. 8-10 uses a pair of arcuately positioned oppositely disposed openings 302 and 304 in the drive member 306. It has an intermediate member 308 which fits on the hexagonal part of shaft 48 and also has an arcuate series of openings 310, 312, 314, 316, 318, 320, 322, 324, 326 and 328. In this instance the intermediate member is shown as having ten such openings therein which are arcuately spaced throughout its circumference on a circle, and the drive member has its two openings 302 and 304 on a circle of the same diameter. Openings 310 and 312 are oppositely disposed on a diameter 330. Openings 314 and 316 are oppositely disposed on a diameter 332. Openings 318 and 320 are oppositely disposed on a diameter 334. Openings 322 and 324 are oppositely disposed on a diameter 336. Openings 326 and 328 are oppositely disposed on a diameter 338. In order to obtain different ranges of adjustability, these diameters are preferably not equally spaced. Considering axis 330 to be the index axis, it is preferred that axis 332 be 40 degrees from it, that axis 334 be 35 degrees from axis 332, that axis 336 be 30 degrees from axis 334, and that axis 338 be 35 degrees from axis 336. This of course then places axis 330 40 degrees from axis 338.

It is also preferred that with this combination of opening relationships, the polygonal opening 340 in intermediate member 308 be a double hexagon so that it in effect has twelve sides rather than six sides, allowing it to be oriented in any one of twelve arcuate positions on shaft 48. This arrangement of opening relationships and polygonal relationships will permit orientation increments of 2.5 degrees or somewhat greater as needed to properly position the drive member 306 relative to its stop as earlier discussed.

Once the proper orientations are attained, a self-locking screw 342 is inserted in each of the openings 302 and 304 and threaded into their mating openings in member 308. For this purpose, all the openings 310 through 328 are internally threaded to receive a screw as needed. This fastens the members 306 and 308 together, and the lock nut 66 is threaded on shaft 48 and tightened to secure the parking brake lever in the proper orientation relative to the shaft 48.

The embodiments of the invention in which an exclusive property or privilege is claimed are defined as follows:

1. In a disc brake assembly having a caliper housing with a parking brake lever stop defining a released position for a parking brake lever, a piston, and a parking brake actuator including a parking brake lever adapted to have parking brake cable means connected therewith for moving the parking brake actuator to move the piston mechanically to actuate the disc brake assembly as a parking brake:

mechanism for establishing a positive disc brake piston position with the parking brake lever positioned at its housing stop during the parking brake release mode and the piston is a desired axially proper adjusted position, said mechanism comprising:

a threaded shaft axially fixed with respect to said caliper housing forming a part of the piston brake actuator, said shaft being mounted for driving rotational movement in the caliper housing and having one end positioned within the caliper housing and threaded and receiving cooperating driven threaded means thereon to act on the piston to mechanically apply the brake assembly in the parking brake mode and to be positioned in the brake release mode to provide an axially adjusted position of said driven threaded means and therefore of the piston, said shaft having on its other end outward of the caliper housing a multi-equal sided non-circular cross section first portion having at least six sides, and said shaft having a second portion, and a threaded end in axial series alignment;

and a parking brake actuating lever assembly forming another part of the parking brake actuator including a first lever portion defined by an intermediate lever assembly portion and a second lever portion defined by the parking brake lever;

said first lever portion having a multi-equal sided non-circular cross section opening receiving said shaft first portion therethrough in any one of a plurality of arcuate positions relative to and in arcuately rotatable driving relation with said shaft and said first lever having at least three equally spaced holes radially aligned relative to said threaded shaft;

said second lever portion being spring biased to a released position and said second lever having an opening receiving said shaft second portion with said second lever portion upon such receipt being in translationally fixed but arcuately relatively movable relation to said shaft, and said second lever having at least three sets of equally spaced holes on concentric arcs for registration with said first lever holes, none of said holes on said second lever being radially aligned relative to said threaded shaft;

connector means joining said first and second lever portions in any one of a series of arcuately relative substantially equi-spaced positions by registration through aligned holes in said first and second levers and thereby establishing a selected fixed arcuate position of said second lever portion in relation to said shaft and a rotatably fixed driving relation between said second lever portion and said shaft through which said shaft may be operatively arcuately rotated by arcuate rotational movement of said second lever portion, the arcuate range of arcuately relative positions available between said shaft and said second lever portion being sufficient to incrementally orient said second lever portion arcuately on said shaft with the brake in the fully adjusted and released position and with said second lever portion engaging the second lever portion stop on said caliper housing and therefore placing said parking brake actuator and actuating lever in the properly adjusted position with said piston in its desired axially proper adjusted position.

2. The method of attaching an arcuately rotatable parking brake lever forming a part of a parking brake lever assembly, the assembly including an intermediate member and the parking brake lever and means selectively securing the intermediate member and the parking brake lever together in a selected arcuate rotation, to an arcuately rotatable parking brake actuator shaft rotatably mounted in a disc brake caliper housing of a disc brake assembly, the shaft having a high lead screw thread for operatively applying a disc brake parking brake in the disc brake assembly when the shaft is arcuately rotated in one direction and for operatively releasing the disc brake parking brake when the shaft is arcuately rotated in the other direction, the disc brake assembly including a caliper and brake linings and a rotor which the brake linings frictionally engage when the brake is actuated by either the service brake or by arcuate movement of the parking brake actuator shaft, the shaft being arranged to be driven arcuately by arcuate movements of the parking brake lever, the attachment to be at or near but arcuately no more than a desired relative arcuate position between the parking brake lever and the shaft, for reference purposes the parking brake lever and the shaft being characterized as having a particular indexed arcuate spacing, an indexed arcuate spacing being the arcuate spacing between an index on the shaft and an index on the parking brake lever, said method comprising the steps of:

(1) positioning the intermediate member on the parking brake lever in a selected orientation and securing the two together in that selected orientation to define the parking brake lever assembly;

(2) detaching a parking brake return spring and then rotating the parking brake actuator shaft in the direction of parking brake application until the brake linings are firmly seated against the rotor but not exceeding 70 Newton-Meters while so rotating;

(3) installing the assembled intermediate member and parking brake lever on the parking brake actuator shaft in a selected orientation which is as close as possible to the released brake lever position wherein the parking brake lever is touching or immediately adjacent the lever release position stop on the brake caliper, this installation to be made without rotating the shaft;

(4) securing the assembled intermediate member and parking brake lever to the parking brake actuator shaft in the orientation of step (3), against relative axial and rotational movements;

(5) applying a predetermined force on the order of 22 Newtons to the parking brake lever at the point where the parking brake cable is to be attached thereto, the force being applied in the direction of parking brake release and in applying that force moving the parking brake lever and the parking brake actuator shaft arcuately in the parking brake release direction to no more extent than the lever release position stop permits;

(6) with the parking brake lever in the arcuate position resulting from step (5), determining the distance between the parking brake lever relative to the lever release position stop as a result of step (5), having established a desired range of the distance position stop of about 0.0 mm minimum to about 5 mm maximum, and determining whether the actual distance is within or greater than the established desired range;

(7) and then performing step (8) below if the actual distance is greater than the established desired range but performing steps (9) through (14) below if the actual distance is within the established desired range;

(8) removing the force applied in step (5) and then removing the means securing the intermediate member and the parking brake lever and repositioning the parking brake lever relative to the intermediate member so that the parking brake lever is as close to the lever release position stop as possible and resecuring the parking brake lever to the intermediate member, and repeat steps (5), (6) and (7) as necessary;

(9) once the actual distance is within the established desired range and determined in step (6) and if that actual distance is less than 3 mm, apply and release the service brake three times and check the brake for brake drag on the rotor;

(10) and if brake drag is found to exist repeat step (8) but repositioning the parking brake lever at least one possible orientation position of the parking brake lever relative to the intermediate member away from the lever release position stop;

(11) repeating steps (9) and (10) as necessary until the actual distance between the parking brake lever and the lever release position stop is no more than 5 mm and no brake drag is found to exist while performing step (9);

(12) attaching the parking brake cable to the parking brake lever and the return spring;

(13) and applying and releasing the parking brake about three times, checking for proper parking brake operation.

* * * * *